United States Patent [19]
Rouverol

[11] Patent Number: 5,802,921
[45] Date of Patent: Sep. 8, 1998

[54] MAXIMUM POWER DENSITY GEARING

[76] Inventor: William S. Rouverol, 1331 Arch St., Berkeley, Calif. 94708

[21] Appl. No.: 898,159

[22] Filed: Jul. 22, 1997

Related U.S. Application Data

[63] Continuation-in-part of Ser. No. 700,692, Aug. 13, 1996, abandoned.

[51] Int. Cl.$^6$ ..................................................... F16H 55/08
[52] U.S. Cl. ............................................... 74/458; 74/462
[58] Field of Search ....................................... 74/458, 462

[56] References Cited

U.S. PATENT DOCUMENTS

| | | | |
|---|---|---|---|
| 3,982,444 | 9/1976 | Rouverol | 74/462 |
| 5,083,474 | 1/1992 | Rouverol | 74/461 X |
| 5,315,790 | 5/1994 | Kish et al. | 74/462 X |
| 5,341,699 | 8/1994 | Rouverol | 74/462 |
| 5,485,761 | 1/1996 | Rouverol | 74/462 |

FOREIGN PATENT DOCUMENTS

| | | | |
|---|---|---|---|
| 561714 | 6/1944 | United Kingdom | 74/462 |

OTHER PUBLICATIONS

Article titled "Design of Helical Gears . . . " Sunaresan et al; JSME MPT91; pp. 1–6, Nov. 1991.
Article titled "Vibration of Power Transmission Helical Gears"; Umezawa et al; Bulletin of JSME, vol. 28, No. 238; pp. 694–700, Apr. 1985.

*Primary Examiner*—Allan D. Herrmann

[57] ABSTRACT

Since the true power density of gearing is a function of the dynamic load, maximization of this critical performance property can be achieved only if both the static component and the dynamic increment of load are minimized. The invention discloses how these two objectives may be achieved in the same gear set. Both static and dynamic tooth stresses are minimized by forming the gears to have an optimum load distribution, a feature realized by using a new type of modification that minimizes the tooth surface relief area. The second requirement, of minimizing the dynamic increment, is accomplished in helical and spiral bevel gearing by proportioning the teeth to have a fully elastic "self-complementary" tooth pair stiffness curve, which gives a mesh stiffness characteristic that remains substantially constant throughout the entire tooth pair engagement angle at all loads and all speeds.

23 Claims, 4 Drawing Sheets

MAXIMUM POWER DENSITY GEARING

RELATED APPLICATION

This application is a continuation-in-part of my patent application U.S. Ser. No. 08/700,692 filed Aug. 13,1996, now abandoned, of the same title. Disclosure Document 402565, filed Jul. 16, 1996, is also relevant.

BACKGROUND OF THE INVENTION

1. Field of the Invention

This invention relates to the shape of gear teeth. Specifically, it relates to gearing having characteristics that maximize torque capacity by means of features that in helical or spiral bevel gearing combine to minimize the peak dynamic tooth loads.

2. Prior Art

The most relevant prior art known to applicant consists of British patent 741,376 (hereinafter Reference 1), and two technical articles: "Design of Helical Gears with Minimum Transmission Error under Manufacturing and Operational Variances", by Sundaresan, S., Ishii, K., and Houser, D. R., JSME MPT 1991, November 1991 (hereinafter Reference 2); and "Vibration of Power Transmission Helical Gears", by Umezawa, K., Suzuki, T., Houjoh, H., and Sato, T., Bulletin of JSME, Vol. 28, No. 238, April 1985, Paper No. 238-18 (hereinafter Reference 3). Distinctions of the invention from the disclosures of these three References will be described below.

Three recent U.S. patents are less relevant but may be of interest. They are U.S. Pat. Nos. 5,083,474, 5,341,699 and 5,485,761, hereinafter References 4, 5, and 6, respectively. These patents disclose a means ("differential crowning") for eliminating mesh stiffness variation in power train spur and straight bevel gearing. The differential crowning concept may also be applied to helical and spiral bevel gearing, as indicated in FIG. 15 of Reference 4 and FIG. 9 of Reference 6, but is not well-adapted to these gear types because the full face width tip and/or root relief area, which is shown crosshatched in the referenced figures, greatly increases the amount of tooth surface material that must be removed, increases the minimum number of teeth, and reduces the maximum allowable pressure angle. All three of these features entail significant reductions in power density.

U.S. Pat. No. 3,982,444 (hereinafter Reference 7) may also be seen as having relevance to the present disclosures with respect to the elimination of finite discontinuities in the tooth pair stiffness curve.

Another recent U.S. Pat. No. 5,315,790 (hereinafter Reference 8), discloses a method of using finite element analysis to calculate magnitudes of tip relief that distribute tooth load evenly over the tooth face width for a given "operating mode". This kind of load-specific topological tooth modification produces greatly increased mesh stiffness variation at loads other than the specified "operating mode", which in turn produces increased transmission error that may excite dynamic loads of sufficient magnitude to become the critical load with respect to potential gear tooth failure.

SUMMARY OF THE INVENTION

The "power density" of a gear pair is the power it can transmit per unit of weight. To maximize power density it is not sufficient to simply maximize the static torque capacity. Power is a function of speed as well as torque, so what must be considered in the maximization process is the "dynamic load". This is the sum of the useful transmitted torque and a supplementary "dynamic increment" that is a function of transmission error and the proximity of the operating speed to a resonance or parametric resonance speed.

Many gear applications are subjected to duty that imposes any and all combinations of load and speed, as for example, the final drive and transmission gears in vehicle propulsion systems. Consequently, there is only one form of gearing that can truly be said to have a maximized "power density". That is a gear set that has two characteristics, one being a maximized static load-carrying capacity of the mesh, and the other being a mesh stiffness variation that is substantially. zero at all loads so transmission error is always minimized. Since the dynamic increment can be as great as two or three times the useful load, if the transmission error is large and operation is at or near the resonance speed, the second of these requirements (the substantial elimination of dynamic increment at all loads) is the most critical. The only previously known method of achieving this second requirement is disclosed in prior art References 4, 5, and 6. The primary objective of the present invention is to go beyond the disclosures of those References by devising a second method of eliminating the dynamic increment at all loads that has the advantage of being based on features that also maximize the load-carrying capacity of the mesh. It is only the combination of both of these characteristics that can be considered to afford a maximization of power density.

DESCRIPTION OF THE PREFERRED EMBODIMENTS

Figure 1:
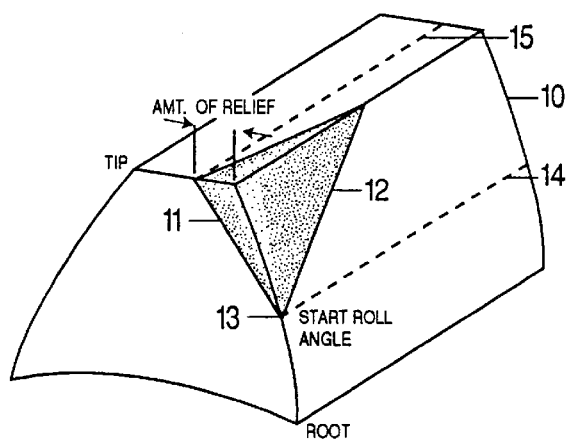
FIG. 1 is an isometric view showing a typical example of a "cross modification" applied to the end of a helical or spiral bevel gear tooth.

In detail and referring to the drawings, FIGS. 1 to 5 inclusive describe and compare to conventional modifications a form of gear tooth modification called "cross modification". This unusual form of modification was initally disclosed in Reference 1, but apparently aroused little interest and was not discussed again until it Novas discussed in References 2 and 3, several decades later. To applicant's knowledge. it has never been used in commercially available gearing or geared products. A major objective of the present specification is to draw attention to the substantial contributions this form of modifiaction can make to the maximization of power density, especially when it is combined with other gear tooth features that take advantage of its very substantial potentialities.

As indicated above, FIG. 1 is an isometric view of a typical helical or spiral bevel tooth 10 which has "cross modification" 11. Instead of the uniform tip relief used in conventional power train gearing, cross modification applies a varying amount of tip relief which is greatest at the end of the tooth 10 and diminishes with distance from the tooth end, as shown in the shaded portion of FIG. 1. Usually the starting roll angle increases linearly with distance from the end of the tooth, so that the starting line 12 is a straight line extending up the tooth face at what is called the "angle of inclination", as determined by the helix (or spiral) and pressure angles. The starting line 12 will in helical gearing be parallel to all of the lines in the working surface of a helical tooth that are called "straight line generators" and lie in the field of contact as diagonals inclined at the base helix angle, depending on the instantaneous contact position of the mating teeth.

In contrast to the cross modification 11 shown in FIG. 1, conventional tip relief having the same starting roll angle, at point 13, would have a uniform starting roll angle and the same amount of relief throughout the full length of the tooth, as indicated by broken lines 14 and 15, respectively. As a result, the portion of the field of contact 21 that is affected by the relief will be quite large. It is shown crosshatched in FIG. 2, and depending on whether the relief is that of the pinion or the gear, will be the large rectangle 22 or 23. (FIG. 2 also shows two contact line array positions in solid lines 24, 25, and broken lines 26, 27, 28, of which line 27 instantaneously contains the field centroid 29.)

Figure 2:
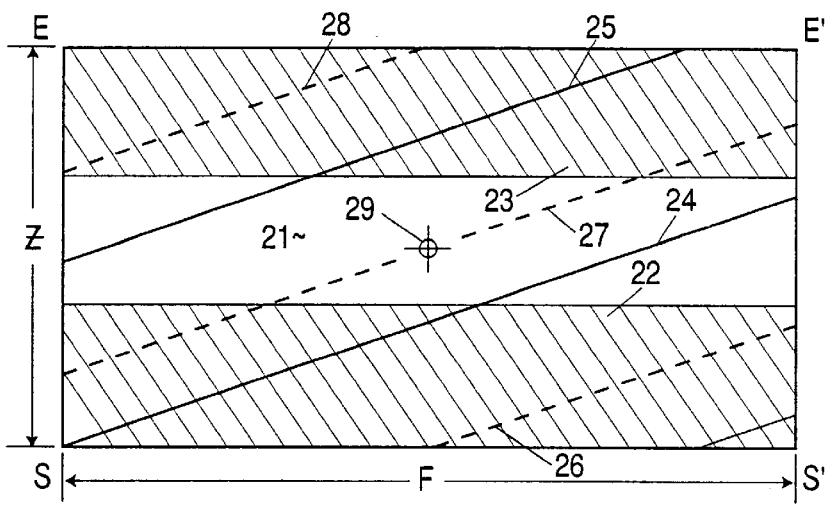
FIG. 2 is a diagram of the field of contact for a typical helical gear pair, showing shaded crosshatched portions that indicate the zones in which conventional tip, and/or root relief of the transverse profiles produces initial separation of the working surfaces, so that load carried by lines of contact furthest from the field centroid is substantially reduced.
Figure 3:
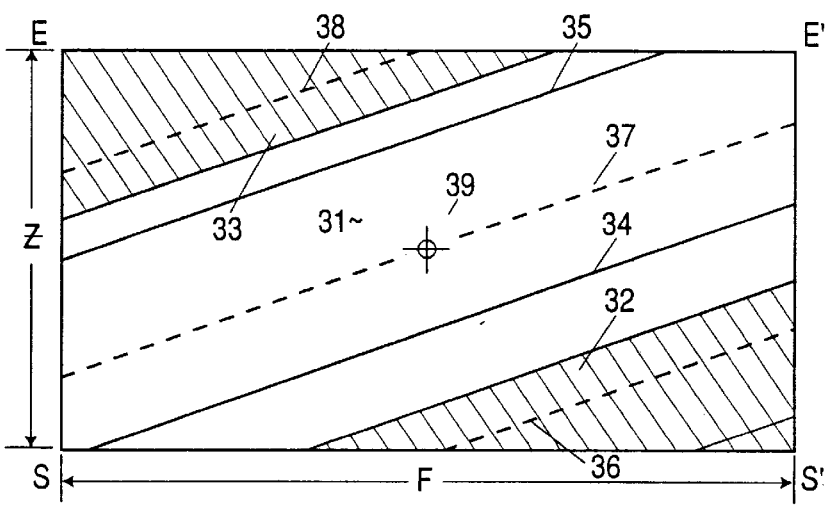
FIG. 3 is a diagram similar to that of FIG. 2, but showing one example of the shape of the zones of initial separation when the teeth have "cross modifications".

FIG. 3 is a field of contact 31 similar to that of FIG. 2, but having crosshatched triangular portions 32, 33 that have much smaller areas than the crosshatched rectangular areas 22, 23 of FIG. 2. In addition, the shape of the volume of material that must be ground off during finishing is pyramidal instead of wedge-shaped. Since the volume of a pyramid is one third of the base area times the height, while that of a wedge is half the base area times the height, and the base area of the triangular cross modified relief zone of FIG. 1 is at most only a third as great as that between broken lines 14 and 15, the volume of material that must be ground off to give the same total relief at the contact line entry and exit points (at S' and E, respectively) is only 20 to 25% as great as that for the gear pair having conventional tip relief. This has major implications with respect to cost, but more importantly with respect to the objectives of the present invention, affords a much more advantageous spreading of the applied load, and therefore substantially increases torque capacity. (Features 34, 35, 36, 37, 38, and 39 in FIG. 3 are the same as features 24, 25, 26, 27, 28, and 29, respectively, in FIG. 2.)

Figure 4:
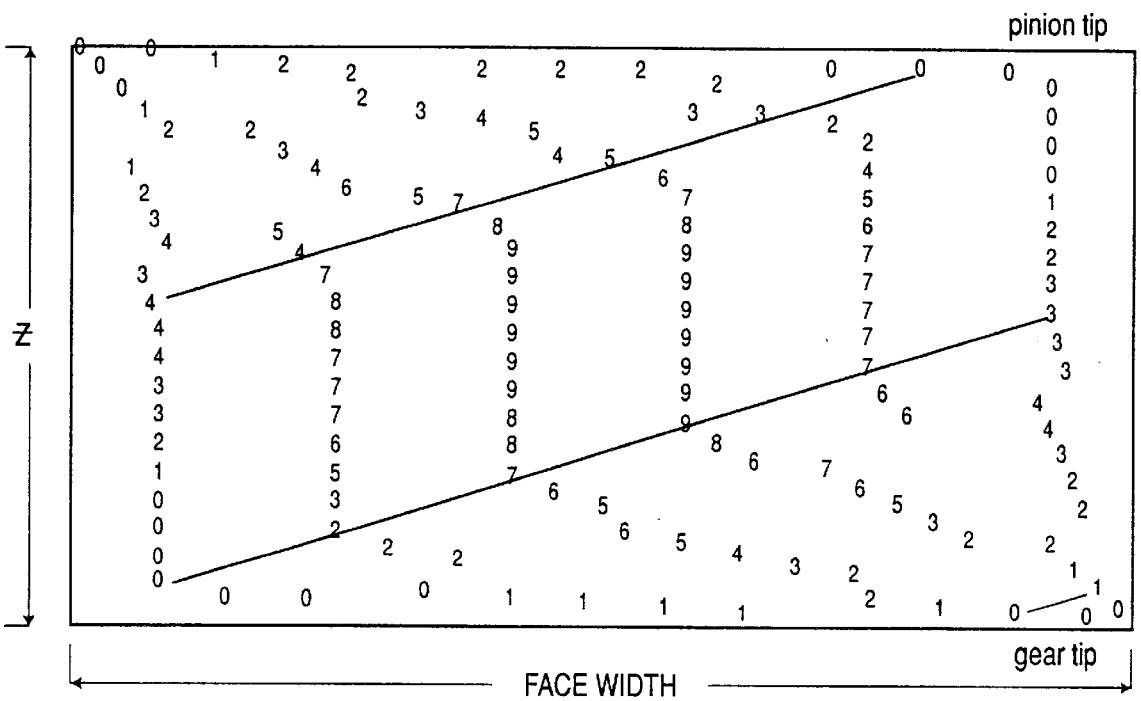
FIG. 4 shows a figure from Reference 2, similar in field proportions to FIG. 2 but enlarged and with different profile relief. This figure has a pattern of numbers from 0 to 9 that represent normalized load distribution along contact lines for 10 sequential sets of contact line positions, including one particular set illustrated by solid lines.
Figure 5:
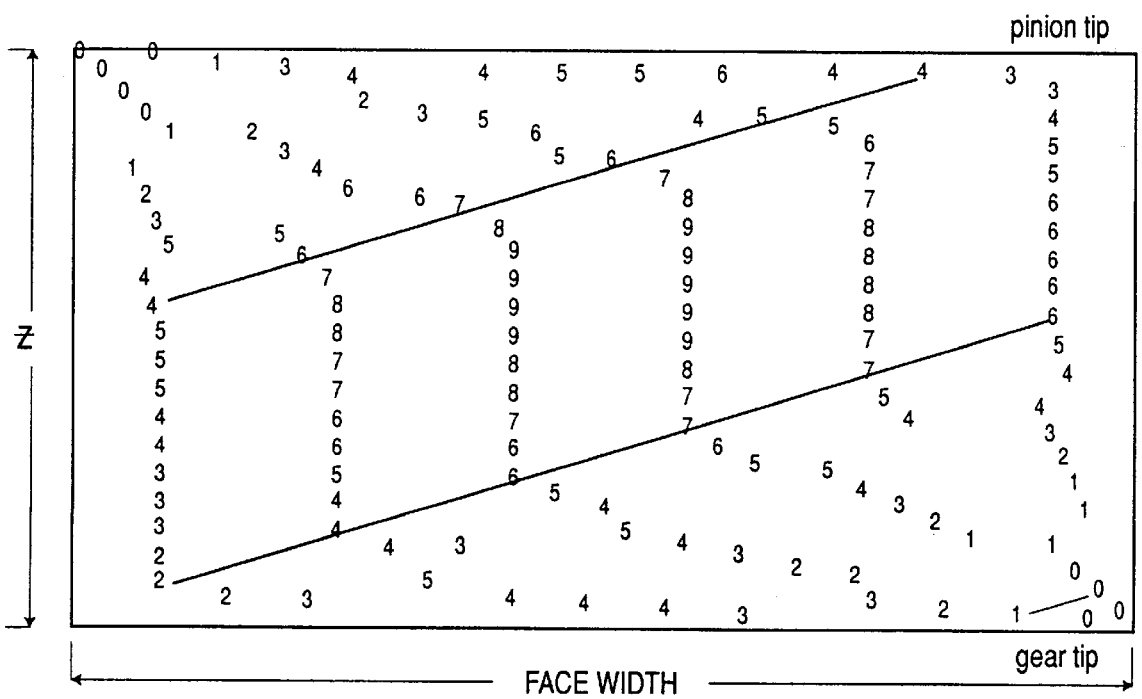
FIG. 5 shows another field of contact from Reference 2, similar to that of FIG. 4, but in this case indicating normalized load distribution for teeth having cross modification instead of conventional profile relief.

FIGS. 4 and 5 are enlarged views of the fields of contact of FIGS. 2 and 3 respectively, and are diagrams presented in Reference 2 to show tooth load distribution normalized to numerical values of 0 to 9 at successive positions of the lines of contact in each field. The longer diagonal lines in FIG. 4 correspond to lines 24 and 25 in FIG. 2, and those in FIG. 5 to lines 34 and 35 in FIG. 3. The most significant differences in these two figures are along the right hand side of the upper boundary and the left hand side of the lower boundary. In FIG. 4 the comparative discrete load figures are 2, 2, 0, 0, and 0 at the top boundary, and 1, 0, 0, 0, and 0 at the lower boundary. For the corresponding load points in FIG. 5, the load figures are 5, 6, 4, 4 , and 3 at the top boundary, and 4, 5, 3, 2, and 2 at the bottom boundary (reading from the center outward). These very great differences are of course the result of the fact that the load points under consideration are inside the crosshatched zone in FIG. 2 but substantially outside it in FIG. 3, so there is much less initial separation of the mating tooth surfaces.

Although only 16 to 18 of the total 137 load points shown in both FIG. 4 and FIG. 5 are actually applying load at any one position of the contact lines (such as the array of three diagonal lines illustrated), a summing of all 137 numbers gives a good basis for comparison of the average maximum load that the given modification system will afford. These sums are 316 for FIG. 4 and 375 for FIG. 5, which represents an increase of average peak load capacity of approximately 19 percent. This confirms the observations of the authors of Reference 2 with respect to comparative "load distribution factors" of the two types of tip relief described. (The Load Distribution Factor of a pair of gears is the ratio of peak local load to average local load.)

This 19 percent advantage for gear pairs having cross modification is a significant increase in torque capacity. But does it represent the maximum increase in torque capacity that is attainable in gear sets having cross modification? It is this question that the present patent specification seeks to answer. FIGS. 6, 7, 8, 9, and 10 are presented to describe a substantial group of features that may be combined with cross modification to raise torque capacity by as much as 100 to 150 percent.

Figure 6:
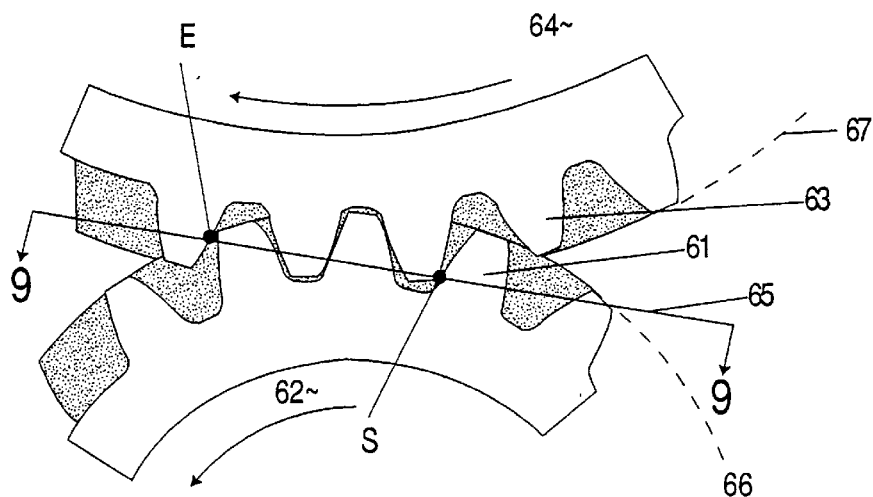
FIG. 6 is a partial end view of a pair of mating gears embodying the invention, showing the transverse tooth profiles and indicating the direction of FIG. 9.

FIG. 6 is a partial end view of a pair of gears 62, 64 showing typical teeth 61, 63 embodying the invention, with arrows showing the direction of motion ("transverse" direction). Teeth 61, on the smaller of the mating pair (pinion 62) and teeth 63 on the larger of the mating pair (gear 64) make contact along a pressure line 65 that contains the path of contact extending from a starting point S to an ending point E. The active heights of the teeth 61, 63 terminate at the addendum circles 66, 67 of the pinion 62 and gear 64, respectively, and determine the position along the pressure line 65 of points S and E, which in turn govern the profile contact ratio. Line 65 is inclined at the operating pressure angle. Other features of pinion 62 and gear 64, such as hubs, webs, rims, keyways, etc., are standard and are omitted in the interest of clarity.

Figure 7:
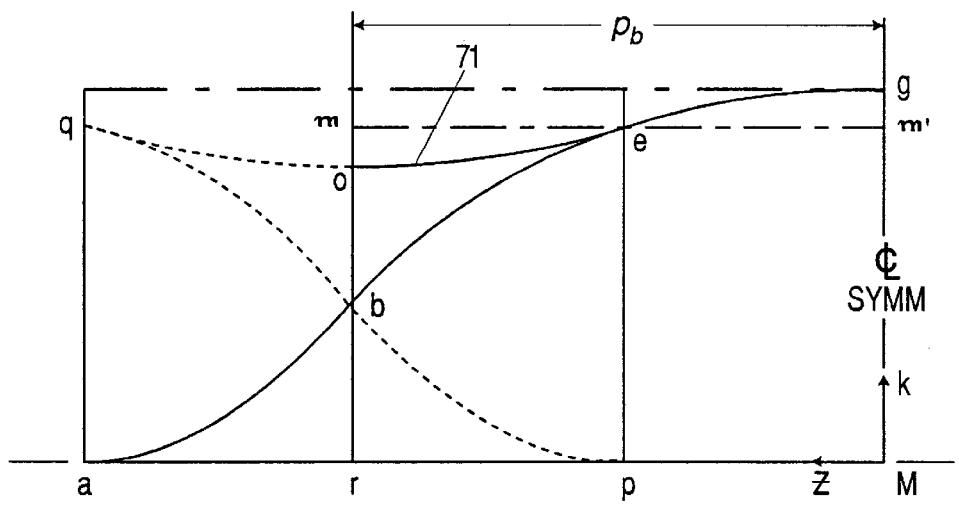
FIG. 7 is a graph showing tooth pair stiffness as a function of transverse displacement (or roll angle) for a tooth pair having a "self-complementary" tooth pair stiffness curve.

FIG. 7 is a graph of tooth pair stiffness k as a function of transverse distance z from the field centroid at M, measured in the direction of motion. The particular curve shown is a special one that was designated in References 5 and 6 as being "self-complementary", meaning that when added to an identical curve indexed by one base pitch in the z direction gives a constant sum for all values of z. As indicated in these earlier references, this kind of curve is the fundamental requirement for creating gear pairs that have constant mesh stiffness throughout the full engagement angle. Since mesh stiffness variation is the primary source of transmission error in well made power train gearing, elimination of this variation is the key to eliminating most if not all of the dynamic increment of load. In other words, it is not possible to maximize the power density of a gear pair without eliminating mesh stiffness variation.

Accordingly, it becomes essential to this objective to identify the special features of the tooth pair stiffness curve 71 in FIG. 7 that give it "self-complementary" properties. These special features are most easily understood if considered in conjunction with two other figures, FIG. 8 and FIG. 9. As indicated above, FIG. 8 is, to a scale of about half that of FIG. 7, a graph that shows how the stiffness curves 71, 81 of two sequential tooth pairs can, if these curves have equal and opposite deviations from an average stiffness curve 83 that has the same ordinate at all positions z along the path of contact, add to a constant sum K (82) that represents the mesh stiffness as a function of transverse position z.

Figure 9:
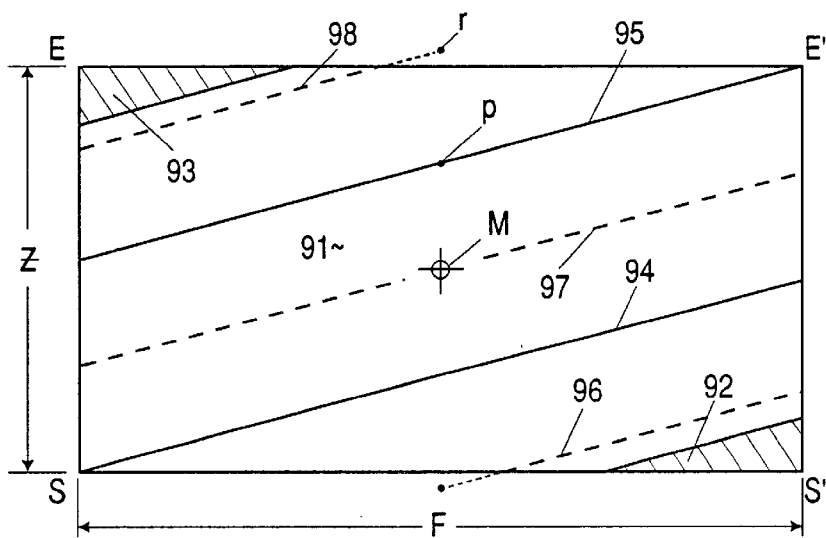
FIG. 9 is a diagram similar to that of FIG. 3 but showing a field of contact for one form of gearing that embodies the invention. The cross modification area is greatly reduced in area so there is no significant region in which tooth pair stiffness, and therefore mesh stiffness, is governed primarily by initial separation of the working surfaces.

In FIG. 9 a field of contact 91 is shown for a gear pair that embodies the invention, in a view directed in accordance with the bent arrows 9—9 in FIG. 6. Two positions of the contact lines, which enter the field 91 at S' and sweep upward, are indicated. These two positions (or "arrays") are the positions of symmetry with respect to the field centroid M, and are designated respectively as the "Centroid Contained" ("CC") position in the case of the contact lines shown as broken lines 96, 97, 98, and "Centroid Straddled" ("CS") position in the case of the contact lines shown solid 94, 95.

In order to relate the positions of specific lines in FIG. 9 to the tooth pair stiffness ordinates plotted in FIG. 7, the values of the z-coordinates M, p, and r at the midplane of field 91 are also identified as to position in FIG. 7. (The scale of FIG. 7 is about twice that of FIG. 9. It should also be noted that for involute gearing, equal increments of distance in the z direction for the various figures also correspond to equal increments of roll angle, since the distance along a line such as pressure line 65 in FIG. 6, measured from the point at which that line is tangent to the base circle, is equal to the roll angle times the base radius.)

Figure 8:
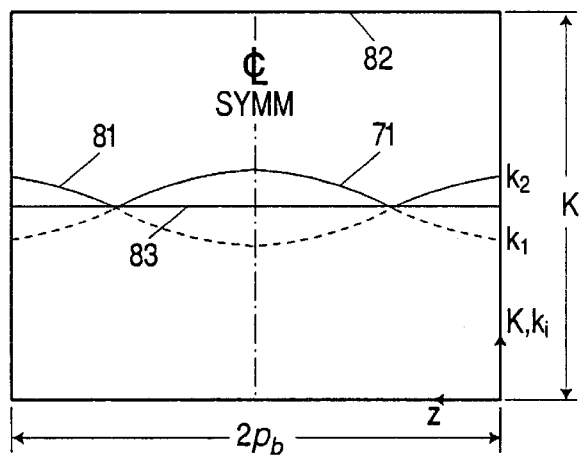
FIG. 8 is a replica of FIG. 8 in Reference 4 which shows how sequential tooth pair stiffness curves such as the one shown in FIG. 7 will, if indexed by one base pitch, add to produce a constant mesh stiffness curve.

From FIG. 8 it will be evident that since equal and opposite deviations from line 83 are required, the feature needed for stiffness curve 71 (for which the solid portion of the left half corresponds to segment e-g in FIG. 7 and the dotted portion to segment o-e) is that the two segments of each half of curve 71 must have polar symmetry with respect to their midpoints e. To produce this characteristic in curve segment o-e-g in FIG. 7, the upper half b-e of the loading ramp a-b-e must have added to it the lower half b-p of the unloading ramp q-b-p of another tooth pair. This means that as tooth pair contact line 96 in FIG. 9 lengthens due to its upward movement until it occupies the position of line 94, line 98 during the same time interval must diminish in length until its stiffness reaches zero at (or slightly beyond) field corner E.

Ideally the cross modification on the trailing tip of the pinion tooth (61 in FIG. 6) should have the form throughout the crosshatched zone 93 of FIG. 9 that makes curve segment o-e polar symmetrical to segment e-g. When this polar symmetry is achieved, the ordinate sums for the CC array 96, 97, 98 in FIG. 9 (represented by ordinates r-o and M-g in FIG. 7) will be equal to those for the CS array 94, 95 in FIG. 9 (represented by ordinate p-e and an identical ordinate the same distance from the centerline of symmetry to the right of ordinate M-g). If the particular form of cross modification disclosed in FIG. 9 is employed, it will give precise control of the shape of the left-most half or two thirds of the stiffness curve 71, because the lengthwise portion of the tooth over which the cross modification extends does not exceed a third or a fourth of the total face width. For many gear applications, however, this amount of control of the polar symmetry is sufficient.

It will be evident from consideration of any field of contact, such as that of FIG. 9, that it is geometrically inevitable that the number of contact lines present in any field for the CS and CC positions must always differ by one, with the number for the CC position being an odd integer, and that for the CS position being the adjacent even integer. Alternation between an odd number of lines and an even number during operation is, of course, at the root of most variations in mesh stiffness. In conventional spur on straight bevel gearing this variation in mesh stiffness is very abrupt, since the entire length of a contact line enters or leaves the field all at once. The effect of this on transmission error, dynamic increment, and operating noise is well known and well documented.

In the case of helical or spiral bevel gearing, lines of contact enter and leave the field of contact much more gradually. If their entering or leaving is synchronized by making the larger of the directional contact ratios (face or profile) an integer, the mesh stiffness can be not only free of abrupt changes, but the differences in stiffness for the CC and CS positions can be made quite small. In fact, the mesh stiffness at these two positions can be made equal for a particular torque load by the introduction of small amounts of initial separation of the working surfaces. This is standard design practice, and has led to development of well-known formulas for the optimum tip and/or root relief that minimizes transmission error at a specified load by reducing the effective stiffness of the outermost tooth contact positions of the CC array in the case of HCR (high contact ratio) gearing or the CS array in the case of LCR (low contact ratio) gearing.

The difficulty with the initial separation method of reducing tooth pair stiffness is two-fold: (a) it is only effective at one load and produces either excessive compliance or excessive stiffness at all loads other than the "design load", with corresponding increases in transmission error,and (b) it makes the gears extremely sensitive to small manufacturing variances, with corresponding increases in the required Quality Number and cost. Prior art forms of cross modification have all suffered from the same limitations. It will be seen in FIG. 3, for example, that the outer contact lines 36, 38 are well within the relieved areas 32, 33, respectively. This means that the field 31 illustrated in this figure, like that of the sample cross modification design analyzed in Reference 2, is "load-specific". That is to say, when the load is larger or smaller than the design load of 8639.00 kgmm, the mesh stiffness for the CC position will be larger or smaller, as the case may be, than that for the CS position, and the transmission error will increase substantially.

The fact that the cross modification that produced the load distribution of FIG. S is of the "load-specific" type may be confirmed by considering the text of Reference 2. Since the form of the cross modification proposed in that reference is parabolic, rather than straight as shown in FIG. 1, the line at which the cross modification starts (e.g., 32, 33 in FIG. 3) is the line of tangency between two curved surfaces: the cross modification surface and the involute helicoid. As such, the exact position of this line of tangency cannot be discerned from a diagram such as FIG. 5. The text of Reference 2, on the other hand, provides an indirect but reasonably accurate defining of the location of the starting line of the modification surfaces.

The key to understanding the particular form of cross modification employed in the analysis of Reference 2 is disclosed in FIG. 6 of that reference, which plots profile relief as a function of roll angle for both pinion and gear. That figure indicates that the chosen form of profile modification on which the study is to be based is what is called "full-field" profile relief. This means that the starting lines of the approach and recess tip relief (corresponding to lines 22 and 23 in our FIG. 2, or 32 and 33 in our FIG. 3) have been moved toward each other until they coincide, that is to say, become a single common line at which both the approach and recess relief zones start.

The position of this common line in both the conventional relief case and the cross modification case can be determined quite accurately from the figures in Reference 2 that plot profile relief against roll angle, i.e. FIGS. 4 and 9. respectively, in that reference. These figures show the minimum PPTE (peak to peak transmission error) to be 0.17 microns at 30% of the distance from the SAP (start of active profile) to the "Tip" in the case of conventional profile relief (FIG. 4 of Reference 2) and to be 0.15 microns at 19% of that distance in the case of cross modification (FIG. 9 of Reference 2). Applying these two percentage values to the path length coordinate Z in FIGS. 2 and 3 would locate the common start-of-relief line quite close to line 22 in FIG. 2 and sloping broken line 37 in FIG. 3. Applying this data to FIGS. 2 and 3 would in both cases cause the crosshatched areas to cover the entire field. The distinctions between such "full-field" profile relief systems and the system disclosed in this specification (FIGS. 9 and 11) are very striking, and lead to substantial differences in Load Distribution Factor and static torque capacity.

To make a particular gear set equally satisfactory at all loads, with mininum sensitivity to fabrication errors, the initial separation of the tooth working surfaces produced by profile relief must be substantially eliminated in favor of a fully elastic form of stiffness reduction, that is to say, by a reduction of the effective length of the outer contact lines. Two methods of doing this are proposed in this specification, and constitute preferred embodiments of the invention. The first of the two methods is approximate and is explained in conjunction with FIG. 9. The second is exact and is described with the aid of FIGS. 10 and 11.

In FIG. 9 it will be seen that the areas 92, 93 in which cross modification influences tooth pair stiffness have been greatly reduced from the corresponding areas 32, 33 in FIG. 3. As a result, the outer contact lines 96, 98 are no longer within the crosshatched zones and hence have no initial separation that is attributable to the cross modification. This has to beneficial effects: (a) it eliminates a significant loss of torque capacity that results from a reduction of the load share borne by the teeth that contact each other on the outermost regions of the field; and, (b) it eliminates the tooth surface modifications that make the stress of these teeth vary with load. To realize these advantages the cross modification must be restricted to the "limens", or boundaries, of the field of contact 91, 111, and to distinguish this restricted form of cross modification from prior art forms of cross modification in this specification and the ensuing claims will have attached to it the designation "liminal". In the embodiment of FIG. 9, for example, the "liminal cross modification" will be seen to be restricted to two small extremities of the field at opposite corners. These zones 92, 93 have only a minor effect on the form of curve 71 in FIG. 7, because the tooth pair stiffness that they influence, generally from point $\underline{a}$ in FIG. 7 to about halfway to point $\underline{r}$, is only a small fraction of the tooth pair stiffness in the central 85 or 90 percent of the field area.

Figure 10:
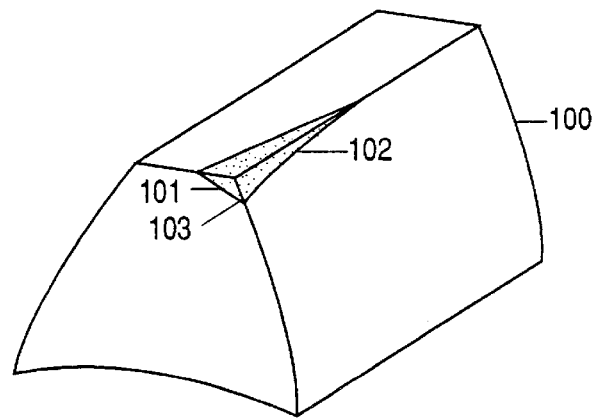
FIG. 10 is a view of a helical or spiral bevel tooth similar to that of FIG. 1, but showing one of several forms of cross modification that are applied to a much smaller area of the tooth working surface. In this case, the area is much longer and narrower than that of the cross modifications that produce the small crosshatched triangular areas of FIG. 9.
Figure 11:
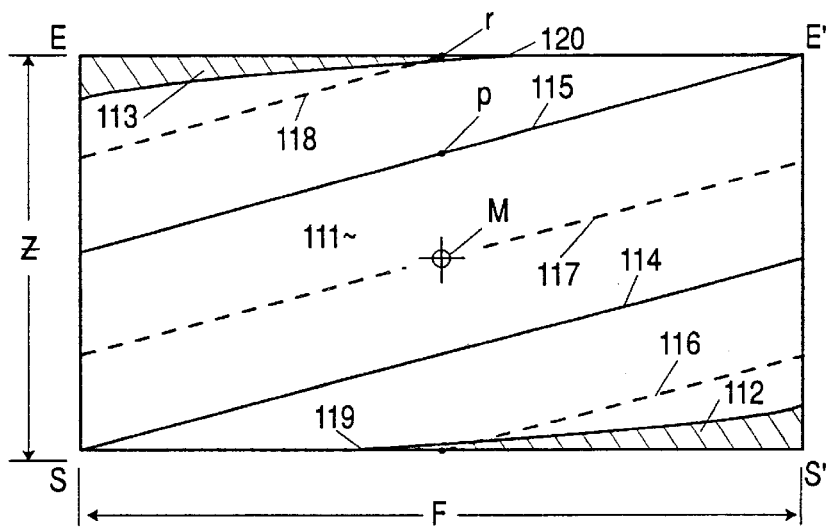
FIG. 11 is a diagram like that of FIG. 9, but showing the area of the field of contact within which the spike-shaped cross modification form disclosed in FIG. 10 affects tooth load.

An alternative embodiment of the invention, shown in FIGS. 10 and 11, can be made as exact as the application may require. In this embodiment the cross modification (102 in FIG. 10; 112, 113 in FIG. 11) has a spike-like shape that makes it have the form of a thin sliver of tip and/or root relief that is tapered substantially to a point 119, 120. The starting line 102 of the tapered tip relief shown in FIG. 10 makes a much smaller angle with the edge of the topland than the starting line 12 of prior art forms of cross modification such as shown in FIG. 1, and may also have a small amount of curvature if that is required to give a precision point at the quarter point of the stiffness ramp (a-b-e in FIG. 7). But this spike-shaped form of cross modification 112, 113 shares two common characteristics with those of 92, 93 of FIG. 9, in that it is (1) restricted to a very small area and (2) that this area is at the threshold (limen) of the field of contact 91, 111, either at an entry or exit corner (S', E) of the field, or one of the transverse boundaries (S'S, EE'). Also, as in the case of the embodiment of FIG. 9, the crosshatched zones (112, 113 in FIG. 11) have little or no overlap with the outermost contact lines 116, 118 of the CC array (116, 117, 118), as a result of which the profile modifications will be too small a contributor to the tooth pair stiffness to produce significant inequality of the mesh stiffness in the CS and CC positions (114, 115; 116, 117, 118) at part load. This avoidance of any significant overlap between the profile relief areas and the outermost symmetrical contact lines is fundamental to ensuring that the mesh stiffness is governed by the elastic properties of the tooth rather than their initial separation. No other method of preventing a set of power train gears from being load-specific appears to be available.

In order to make the scope of the ensuing claims specific it is necessary to provide an exact boundary between a "liminal" cross modification and known forms of cross modification cited in the References. Such a boundary may be expressed in either physical terms, as a maximum variation of tooth pair stiffness, or in geometric terms, as a maximum volume of working surface material removed by the modification. For the purpose of completeness, the boundary will be defined in both ways: if the cross modification is within either the physical boundary or the geometric boundary, it will, for the purposes of the ensuing claims, be construed as a "liminal" cross modification.

The boundaries or limits of a particular cross modification that determine whether or not it constitutes a "liminal" cross modification are based on its relation to the outermost pair of symmetrically arrayed contact lines, such as lines 96 and 98 of FIG. 9 or 116 and 118 of FIG. 11. In the case of gear sets classified on this physical basis, the criterion is the reduction in the combined tooth pair stiffness of the teeth in contact along the full lengths of these two lines. If the reduction produced by a particular cross modification is less than fifteen percent of the stiffness at peak load, then the cross modification is a "liminal" cross modification. (As noted above, in the case of the conventional cross modification diagrammed in FIG. 5, the reduction is thirty-one percent.)

In the case of a particular cross modification that is to be classified on a geometric basis, the criterion is the amount of working surface material the cross modification removes at or beyond (i.e., farthest from the field entry or exit corner, as the case may be) the outermost pair of symmetrically arrayed contact lines. Ideally the crosshatched areas (92 and 93 in FIG. 9 or 112 and 113 in FIG. 11) will not reach these outermost lines, but if they do, as in FIG. 11, it is only a thin end portion of the spikeshaped area 112, 113 that overlaps the contact line (e.g., segment r-120 in FIG. 11). To restrict the cross modification to a region in which it will not produce detrimental initial separation along any significant portion of these outermost lines of contact, the combined area shown crosshatched in fields such as those shown in FIGS. 9 and 11 should not exceed a certain critical percentage of the total field area. That critical percentage is different for fields of different proportions, such as HCR and LCR gears, so it is much simpler and more direct to define the limits of liminal cross modification by reference to the base pitch.

Both FIG. 9 and FIG. 11 show a plurality of alternating solid and broken lines that represent the contact lines for the CS and CC positions respectively. Since the transverse (z-direction) distance between adjacent lines is, in all cases, one half a base pitch, it follows that the minimum transverse distance from the outermost lines (96, 98; 116, 118) to the closest field corner (S' or E, as the case may be) cannot be greater than one-half a base pitch, for otherwise these outermost lines would no longer be outermost. If we define the crosshatched right triangle 92 in FIG. 9, for example, as having a "height" that is collinear with field side, S'-E', it may be said that the geometric description of a cross modification that is "liminal" is one that produces a triangular corner relief area having a height that does not exceed one-half a base pitch.

If this definition is applied to the cross modifications illustrated in References 1, 2, and 3, it will be evident that none of them shows a cross modification that is liminal. In the case of the gear tooth b shown in FIG. 3 of Reference 1, it has a cross modification a having a base x and a height that scales to slightly more than half the active tooth height. Since typical turbine gearing may be expected to have a profile contact ratio of perhaps 1.4 to 1.6, the path length will be 1.4 to 1.6 times the base pitch, half of which is 0.7 to 0.8 times the base pitch. This is obviously greater than 0.5 times the base pitch, so the cross modification illustrated does not fall within the above definition of "liminal".

In the case of Reference 2, as noted above, the cross modification described in this article (Section 2.2) is of the "full-field" type, so that the relief for corners S' and E in FIG. 3 both start at broken line 37, and the entire field would be crosshatched. It will be evident that line 37 in this figure intersects the right end face S'-E' about three fourths of the way from S' to E', and the left end face S-E about three fourths of the way from E to S. Since the profile contact ratio for this design is 2.02 (Table 2 and FIG. 11 of Reference 2) the relieved areas, 32 and 33 of FIG. 3, will have been enlarged enough to be trapezoids, the height of which, at the large end, is approximately three fourths of 2.02 times the base pitch, that is to say, 1.5 times the base pitch. This is three times as great as the 0.5 times the base pitch that has been set above as the maximum height of a cross modification that qualifies as "liminal".

In the case of Reference 3, FIG. 2 of that article shows a cross modification having a starting line, C–C', that intersects the left side of the field of contact at a distance D-C from the upper left corner D. The text indicates that C is one base pitch from D, which is a distance twice as great as the 0.5 base pitch that is the specified maximum height of a liminal cross modification.

To ensure that the tooth pair stiffness curve of FIG. 7 has a self-complementary characteristic that is based on the elastic properties of the teeth, and hence is substantially unaffected by changes of transmitted load, the teeth of gear pairs embodying the invention should ideally have a number of geometric features combined with the liminal cross modifications described above. These include the following: (1) To synchronize the loading of one tooth pair with the unloading of another tooth pair, the length of the field Z from the entry point S' in FIG. 11 to the beginning of the unloading ramp at E' must be an integral number of base pitch lengths. Since the field sides that govern contact line length, and therefore define the start and end of the loading and unloading ramps, are determined by whichever directional contact ratio (profile or face) is larger, the synchronization of loading and unloading of tooth pairs that is essential to the avoidance of finite discontinuities in the tooth pair stiffness curve requires that the larger of the directional contact ratios be close to an integer, say within 0.08, and preferably 0.04. (In the case of the approximate method of synchronizing the loading and unloading of the teeth disclosed in conjunction with FIG. 9, this ideal specification for the FIG. 11 embodiment is altered somewhat, to call for the larger of the directional contact ratios to be between 0.05 and 0.15 smaller than an integer.) (2) Although not as important as synchronization, there is a second characteristic that contributes significantly to the realization of the self-complementary shape needed by the tooth pair stiffness curve, by ensuring that the correction of the basic tooth pair stiffness curve a-b-e in FIG. 7 gives to curve 71 polar symmetry with respect to its midpoint e. As is evident from FIG. 7, the point e has the same abscissa as point p, both being one half a base pitch distance from the curve centerline M-m'. Since the ramp portion of curve a-b-e-g is the portion that is manipulated to produce the desired polar symmetry (by shaping segment a-b so its ordinates add to those of segment b-e to give the polar symmetrical segment o-e of curve 71), the requisite condition is that the upper end of the ramp be at point e. To achieve this, contact line 115 in FIG. 11 must pass through point E', which also means that the other contact line 114 of the CS position will pass through point S. Since the distance p-r is half a base pitch, and r-F' is half the face width F, the face contact ratio is unity, and therefore 1.0 smaller than the profile contact ratio. While the contact ratios diagramed in FIGS. 9 and 11 give the closest approximation to a polar symmetrical tooth pair stiffness curve (FIG.7), any other pair of directional contact ratios that differ by an amount within 0.05, and preferably 0.02, of an integer will be almost as effective.

The power density of a gear set of course does not depend solely on the special features described above. Depending on the application, a number of other features may be introduced in order to ensure that power density is maximized, including the following: (1) optimum materials, heat treatment, surface finish, shot peening, copper washed toplands, fillet shape, etc.; (2) a tooth thickness ratio between the pinion and gear that is within 0.10, and preferably 0.05, of the critical ratio that makes the tooth pair stiffness curve (FIG. 7) substantially symmetrical with respect to its centerline, in order to minimize the load distribution factor and make both pinion and gear equally critical with respect to fatigue strength; (3) a maximized normal operating pressure angle, which is greater than 16 degrees, and preferably greater than 20 degrees; (4) a helix or spiral angle that is less than 30 degrees, and preferably less than 25 degrees; (5) an addendum coefficient ratio that is within 0.10, and preferably 0.05, of the critical addendum coefficient ratio that makes the gear set equally critical for failure by tooth breakage and by surface pitting; (6) the number of teeth on the smaller of the gear pair is within two teeth, and preferably one tooth, of the critical number of teeth that makes the pair equally critical for failure by tooth breakage and by surface pitting; and, (7) the working surfaces of the teeth have contiguous points of zero net deviation from mathematically conjugate tooth surfaces throughout at least one full pitch angle, and preferably one full angle of contact, since this not only helps to minimize the load distribution factor but also prevents tooth rattle at very light torque loads.

An important application of the invention is in standardized interchangeable gearing, which is generally marketed under the designation "stock gearing". Conventional hardened steel gearing is not well adapted to this application because it is inherently load-specific. As noted previously, conventional tip and/or root relief is correct for only one particular torque load and is excessive or inadequate at all other torque loads. This is probably a major reason why nearly all stock gearing that is commercially available is of the low power density variety, usually made of cast iron or unhardened steel. Such gearing is generally made with no tip and/or root relief, so it is equally suited for any torque load, provided that load is small enough.

For gearing that is required to transmit large amounts of power, there are two features that are essential if it is to have a maximized power density, as noted above: (1) a relief form that minimizes the load distribution factor, and (2) tooth geometry and proportions that produce a tooth pair stiffness curve that is elastically selfcomplementary. To make such gearing available as stock gearing that is both standardized and interchangeable, it should have most or all of several additional characteristics, including the following: (1) all tooth numbers of both pinions and gears should have a common base pitch and an absolute base helix or spiral angle that is the same for all pinions and all gears, but is of course opposite hand for the pinions and gears; (2) the tooth thickness ratio should be greater than unity; (3) the addendum heights should be selected to produce more recess action than approach action; and (4) gears with larger tooth numbers should have greater crowning but smaller liminal cross modification than gears with smaller tooth numbers.

Except for the term "liminal cross modification".which has been defined above as it is unique to this specification, the terms used in the foregoing text and the ensuing claims shall have the same definitions as in the cited References, unless a redefining has been specifically provided.

Several observations may be made with respect to the invention disclosed in this specification: (1) For the purposes of this specification and the ensuing claims, zero should be construed as an integer. This means that claim 12 reads on designs that have substantially equal face and profile contact ratios, including designs for which both are unity.

(2) The amount of relief provided by the cross modification may vary linearly, as shown in FIG. 1, or may vary parabolically, or a combination of both, or any polynomial.

(3) As noted above, gear sets embodying the invention will in all cases (aside from applications where maximum tooth misalignment is less than 20 or 30 percent of maximum mesh deflection) have the liminal cross modification superimposed on (i.e., added to) lengthwise crowning or tooth end relief, which ideally is the same at all roll angles.

Differential crowing (References 4, 5, and 6) could of course be used in conjunction with the invention herein disclosed but is not needed and sacrifices a certain amount of torque capacity compared to that of gear sets embodying the present invention that obtain optimum values of tooth pair stiffness by specifying particular field proportions and tooth geometry rather than the removal of substantial amounts of tooth working surface material.

I claim:

1. A pair of mating gears having teeth slantingly disposed with respect to the common pitch element,
   said teeth on at least one, and preferably both, of said pair having liminal cross modification.

2. A pair of mating gears having teeth slantingly disposed with respect to the common pitch element,
   said teeth on at least one, and preferably both, of said pair having liminal cross modification,
   the tooth pair stiffness curve of said pair being elastically self-complementary over most, and preferably all, of the operating load range of said pair.

3. A pair of mating gears having teeth slantingly disposed with respect to the common pitch element,
   said teeth on at least one, and preferably both, of said pair having liminal cross modification,
   the larger of the directional contact ratios of said pair being within 0.08, and preferably 0.04, of an integer.

4. A pair of mating gears having teeth slantingly disposed with respect to the common pitch element,
   said teeth on at least one, and preferably both, of said pair having liminal cross modification,
   the larger of the directional contact ratios of said pair being between 0.05 and 0.15 smaller than an integer.

5. A pair of mating gears having teeth slantingly disposed with respect to the common pitch element,
   said teeth on at least one, and preferably both, of said pair having liminal cross modification,
   the mesh stiffness of said pair when its contact lines are in the centroid-straddled position being substantially the same as when they are in the centroid-contained position.

6. A pair of mating gears having teeth slantingly disposed with respect to the common pitch element,
   said teeth on at least one, and preferably both, of said pair having liminal cross modification,
   the shape of said liminal cross modification being substantially a triangle, one side of which coincides with a straight line generator lying in (a) the working surface of one of said pair and (b) the field of contact of said pair at a particular roll angle of said one of said pair,
   said straight line generator when lying in said field being further from the centroid of said field than the lines of contact that are symmetrically disposed with respect to said centroid and furthest therefrom.

7. A pair of mating gears having teeth slantingly disposed with respect to the common pitch element,
   said teeth on at least one, and preferably both, of said pair having liminal cross modification that has no boundary parallel to the straight line generators of any working surface of said teeth.

8. A pair of mating gears having teeth slantingly disposed with respect to the common pitch element,
   said teeth on at least one, and preferably both, of said pair having liminal cross modification applied to narrow spiked-shaped regions along at least one edge of the tooth working surface.

9. A pair of mating gears having teeth slantingly disposed with respect to the common pitch element, said teeth on at least one, and preferably both, of said pair having liminal cross modification that varies in amount non-linearly with distance from the end face of the tooth at which it has its maximum value.

10. A pair of mating gears having teeth slantingly disposed with respect to the common pitch element, said teeth on at least one, and preferably both, of said pair having liminal cross modification that produces precision stiffness values at the quarter point and the midpoint of the tooth pair stiffness curve ramp.

11. A pair of mating gears having teeth slantingly disposed with respect to the common pitch element, said teeth on at least one, and preferably both, of said pair having liminal spike-shaped cross modification that is formed to give to the ordinates of the outer halves of the tooth pair stiffness curve ramps the particular value at each roll angle that when added to the ordinates of the inner halves of the complementary ramp give to the half-lengths of the tooth pair stiffness curve polar symmetry with respect to their midpoints.

12. A pair of mating gears having teeth slantingly disposed with respect to the common pitch element, said teeth on at least one, and preferably both, of said pair having liminal cross modification, the profile and face contact ratios of said pair differing by an amount that is within 0.05, and preferably 0.02, of an integer.

13. A pair of mating gears according to any of claims 1 through 12 wherein the thickness ratio of said teeth is within 0.10, and preferably 0.05, of the critical thickness ratio.

14. A pair of mating gears according to any of claims 1 through 12 wherein operating pressure angle in the normal direction is greater than 16 degrees, and preferably greater than 20 degrees.

15. A pair of mating gears according to any of claims 1 through 12 wherein the angle between said teeth and said common pitch element is less than 30 degrees, and preferably less than 25 degrees.

16. A pair of mating gears according to any of claims 1 through 12 wherein the addendum coefficient ratio is within 0.10, and preferably 0.05, of the critical addendum coefficient ratio.

17. A pair of mating gears according to any of claims 1 through 12 wherein the number of teeth on the smaller of said pair is within two teeth, and preferably one tooth, of the critical number of teeth.

18. A pair of mating gears according to any of claims 1 through 12 wherein the working surfaces of the teeth of said pair have contiguous points of zero net deviation from mathematically conjugate tooth surfaces throughout at least one full pitch angle, and preferably one full angle of contact.

19. A pair of mating gears according to any of claims 1 through 12 wherein the lengthwise portion of the tooth over which said liminal cross modification extends does not exceed one third, and preferably one fourth, of the total face width of said one of said pair.

20. A pair of mating gears according to any of claims 1 through 12 wherein each of said pair is a member of a large set of fully interchangeable gears having different tooth numbers but identical base pitch and absolute value of base helix angle.

21. A pair of mating gears according to claim 20 wherein the tooth thickness ratio is greater than unity.

22. A pair of mating gears according to claim 20 wherein the addendum heights are selected to produce more recess action than approach action.

23. A pair of mating gears according to claim 20 wherein gears with larger tooth numbers have greater crowning but smaller liminal cross modification than gears with smaller tooth number.

* * * * *